United States Patent
Grace

(12) 
(10) Patent No.: US 6,818,248 B1
(45) Date of Patent: Nov. 16, 2004

(54) FIRE RETARDANT ADHESIVE TISSUE

(75) Inventor: Frank C. Grace, North Dartmouth, MA (US)

(73) Assignee: Harodite Industries, Inc., North Dichton, MA (US)

( * ) Notice: Subject to any disclaimer, the term of this patent is extended or adjusted under 35 U.S.C. 154(b) by 478 days.

(21) Appl. No.: 09/933,191

(22) Filed: Aug. 20, 2001

(51) Int. Cl.[7] .................................................. B05D 5/10
(52) U.S. Cl. ..................... 427/208.2; 427/288; 427/356; 427/391; 427/395; 427/398.1
(58) Field of Search ............................ 427/208.2, 288, 427/356, 391, 395, 398.1

*Primary Examiner*—Bernard Pianalto
(74) *Attorney, Agent, or Firm*—Reed Smith LLP; Michael I. Wolfson

(57) ABSTRACT

A flame retardant adhesive tissue paper for fabricating moldable structures, particularly suitable for forming laminates for the interior of automobiles is provided. The flame retardant adhesive tissue is prepared by screen printing an aqueous paste dispersion including a flame retardant and thermoplastic adhesive dispersed therein in discontinuous pattern onto one surface of the paper. After removal of water, the drying temperatures is increased to activate the thermoplastic adhesive to adhere to the surface of the tissue with the flame retardants solids dispersed within the interior of the tissue paper. The adhesive coated tissue paper has good acoustic properties and imparts flame retardancy to a laminate including it.

7 Claims, 3 Drawing Sheets

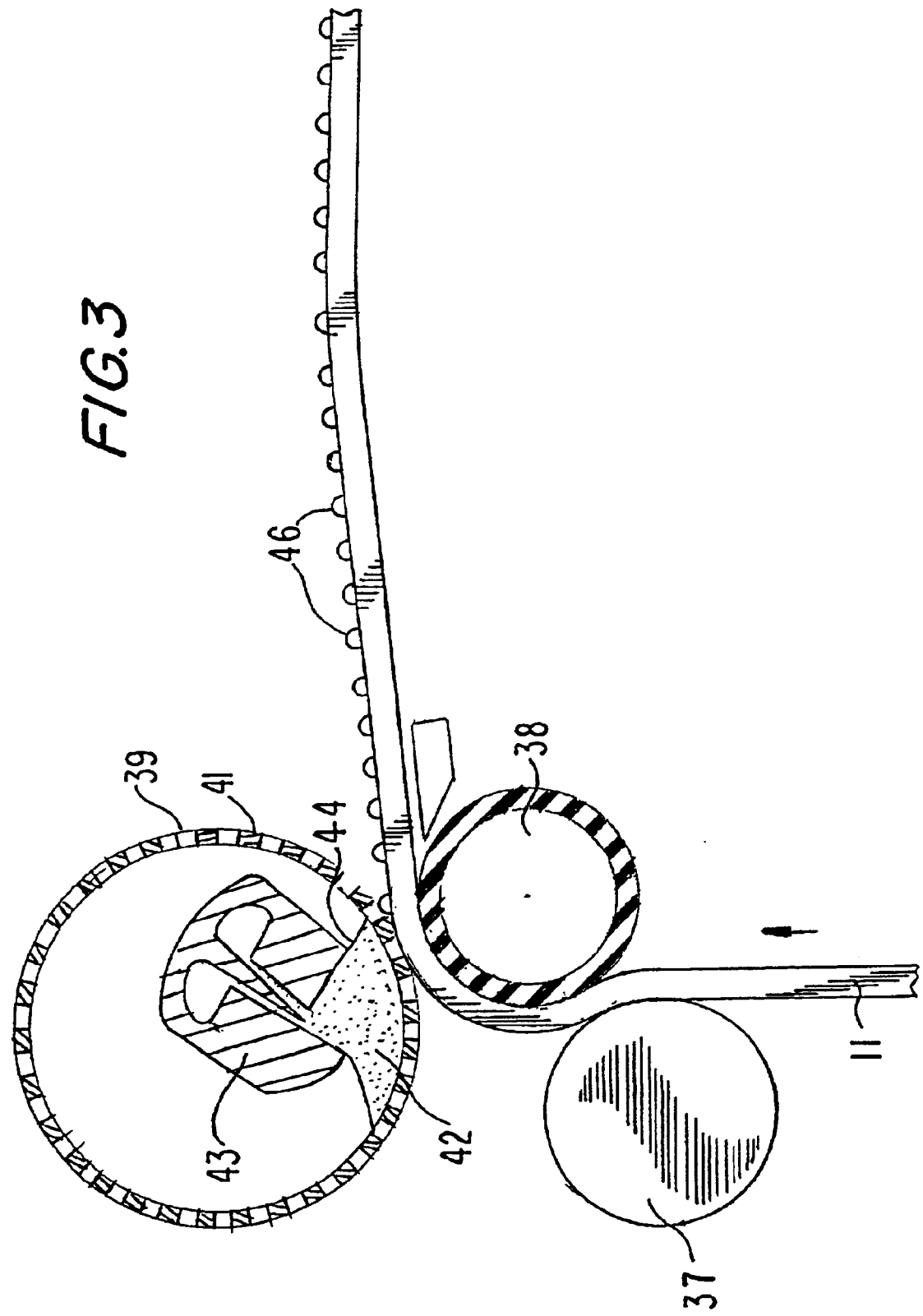

FIRE RETARDANT ADHESIVE TISSUE

BACKGROUND OF THE INVENTION

This invention relates to a fire retardant adhesive tissue and a method of manufacture, and more particularly to a fire retardant tissue paper which has been treated with a dispersion of fire retardant and adhesive to provide a tissue with the fire retardant solids disbursed within the tissue paper and adhesive dots on the surface.

Tissue paper is utilized in a wide variety of industrial applications. One such application is as a portion of a laminate utilized in automobiles for improving sound insulation. In addition to its sound insulation properties, it is highly desirable that the tissue paper be treated with a flame retardant so that the final product will be flame retardant and still have good acoustic properties when in composite form.

Tissue paper typically used in automotive applications is of a grade that has a weight of between about 17 to 21 g/m$^2$ (0.5 to 0.6 oz/yd$^2$). This is a difficult material to work with due to the extremely low tensile strength of the material. Since many flame retardant solids are provided in aqueous solutions, once the fragile tissue paper is wetted, it would tend to tear when being transported through the manufacturing process. Further, it is desirable not to have to apply the flame retardant and the adhesive in separate operations due to the fragile nature of the materials. Various processing options are available. This includes hot melt coating to apply the adhesive without causing the paper to become brittle or degrading the cellulose in the paper.

In view of the difficulty in handling a low tensile strength material such as tissue paper, it is highly desirable to provide a flame retardant adhesive tissue paper which can be manufactured without degrading the paper and which will overcome the processing difficulties in the prior art. Such a flame retardant adhesive tissue finds particular utility in automotive application where such papers are utilized in various vehicle interior laminates.

SUMMARY OF THE INVENTION

Generally speaking, in accordance with the invention, a flame retardant adhesive tissue paper for fabricating moldable structures and methods of fabrication of the tissue paper are provide. The flame retardant adhesive tissue paper is prepared by applying an aqueous paste dispersion including a flame retardant and thermoplastic adhesive dispersed therein to the surface of the paper using a printing screen. This coating adds 25 to 50% dry solids on the surface based on the weight of the paper. The amount of paste coating applied to the paper is controlled by the pumping speed of the dispersion to the screen-print head and the transport speed of the paper past the print head.

When an aqueous paste dispersion is screen printed onto the tissue paper and dried, the flame retardant solids in the paste dispersion wet out the paper leaving the adhesive dots on the surface of the paper. This causes the flame retardant solids to be soaked into the cellulosic material and impart flame retardant properties to the adhesive coated paper. After application of the dispersion, the paper goes through a forced air oven at controlled speed to dry off the water.

After drying, the flame retardant solids and polymer adhesives stay behind on the paper. After all the water is removed, oven temperature is increased to activate the polymer adhesive causing it to flow and adhere to the paper. As the coated paper leaves the oven, it is batched on rolls and ready for shipment.

Accordingly, it is an object of the invention to provide a tissue paper which has added flame retardant properties and thermoplastic adhesive dots on its surface.

Another object of the invention is to provide an improved flame retardant adhesive tissue paper including dots of thermoplastic adhesive on the surface and flame retardant solids dispersed in the cellulose material A further object of the invention is to provide a process for preparing a flame retardant adhesive tissue paper having a weight about 15.5 to 22.0 g/m$^2$ (0.45 to 0.65 oz/yd$^2$).

Yet another object of the invention is to provide an improved flame retardant adhesive tissue paper wherein the flame retardant solids are dispersed within the cellulosic material of the tissue paper.

Yet a further object of the invention is to provide a flame retardant adhesive tissue wherein the flame retardant solids are dispersed within the tissue and the adhesive dots on the surface are of polyester.

Still a further object of the invention is to provide a method for preparing a flame retardant adhesive tissue without damaging tissue paper.

Still other objects and advantages of the invention will in part be obvious and will in part be apparent from the specification.

The invention, accordingly comprises an article possessing the characteristics, properties and relation of constituent, and the several steps of one of more of such steps with respect to each of the others, all as exemplified in the detailed disclosure hereinafter setforth, and the scope of the invention will be indicated in the claims.

BRIEF DESCRIPTION OF THE DRAWINGS

For a fuller understanding of the invention, references is had to the following description taken in connection with the accompanying drawings, in which:

FIG. 3 is an enlarged view of the rotating doctor blade of the screen print coating head in the apparatus of FIG. 2.

DESCRIPTION OF THE PREFERRED EMBODIMENTS

Figure 1:
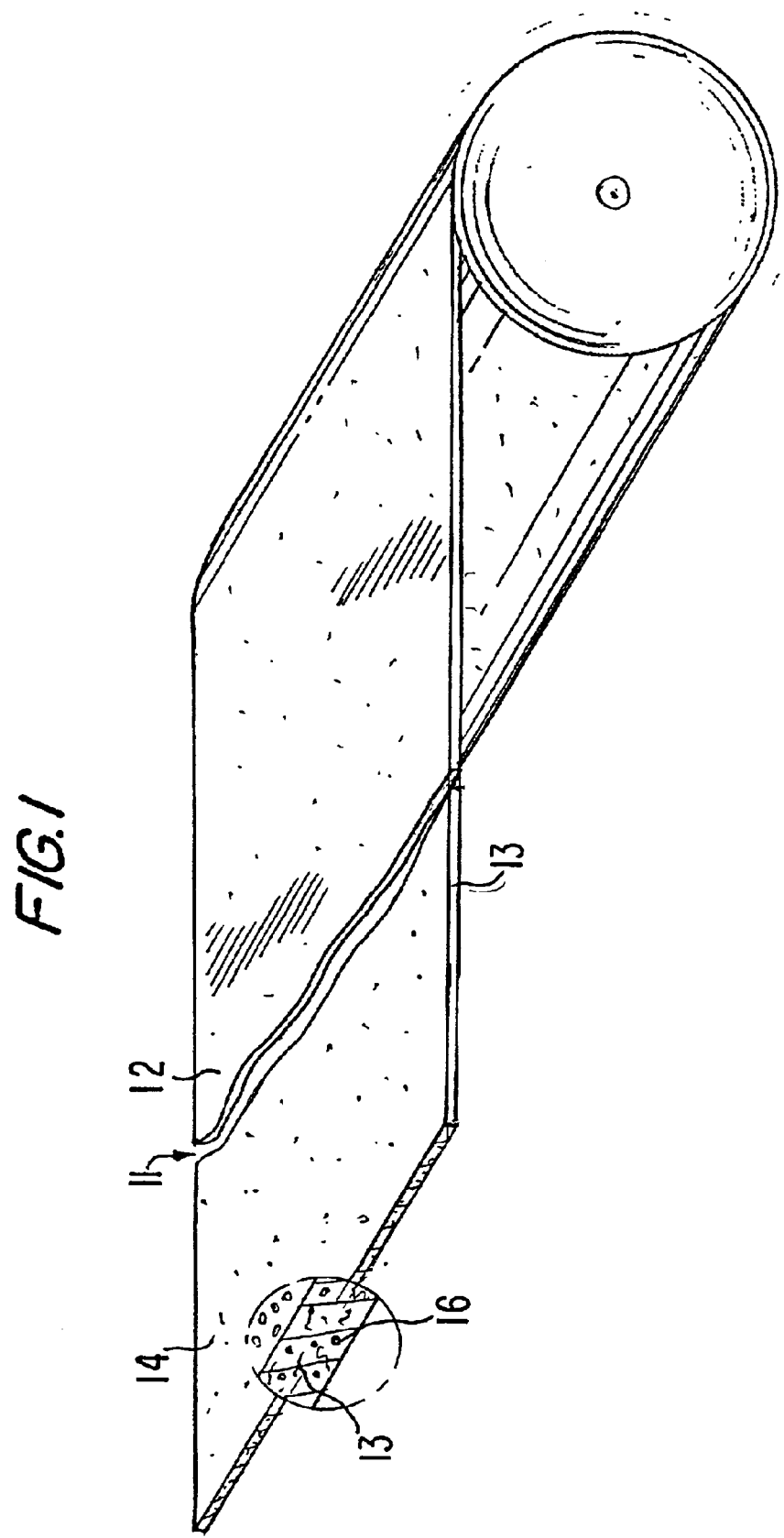
FIG. 1 is a perspective view of a length of fire retardant adhesive tissue paper constructed and arranged in accordance with the invention.

A flame retardant adhesive tissue paper 11 constructed and arranged in accordance with the invention is shown in perspective in FIG. 1. Tissue paper 11 is formed of a base starting tissue paper 12 of fibers 13, such as cellulose fiber used in conventional tissue papers. Tissue paper 11 includes a plurality of adhesive dots arranged in a discontinuous coating, either in a geometric or random pattern on the upper surface thereof. The spots may be in a regular shape or form, such as dots 14. Flame retardant particles 16 are dispersed within tissue paper 12 between cellulose fibers 13.

The uncoated weight of tissue paper 12 before going through the process in accordance with the invention, is between about 14.6 to 22.0 g/m$^2$ (0.43 to 0.65 oz/yd$^2$). Such paper is available from a variety of paper manufacturers and is known as an 11 pound paper in the U.S. paper industry. This designation is utilized instead of reporting the weigh in or g/m$^2$ or oz/yd$^2$. This means that the tissue paper weighs 5 kilograms per 279 square meters (11 pounds per 3,000 square feet).

The tensile strength of dry tissue paper 12 in the machine direction is between about 500 to 1,200 g/in. Tensile strength in the transverse direction is between about 200 to 550 g/in. Preferably, the wet tensile strength in the machine direction is targeted to be between about 350 to 450 g/in. A wet strength lower than 250 g/in is not desirable, but a higher wet machine direction tensile strength is acceptable.

Tissue paper 11 is light and stretches considerably. The stretch of a dry tissue in the machine direction at break is about 17.5 to 25%. Porosity is targeted at 38.1 cm$^2$ s/sq (75ft.$^3$/Min/ft$^2$) and is in the range of between about 30.5 to 45.7 cm$^3$ /s/sq (60 to 90 ft. $^3$/min/ft$^2$). Such a paper is suitable for internal automotive use due to its wet strength in the machine direction and for the porosity properties. Generally, tissue paper 11 must be free from pin holes and or other defects that may be detrimental to the acoustic properties of the final product.

Figure 2:
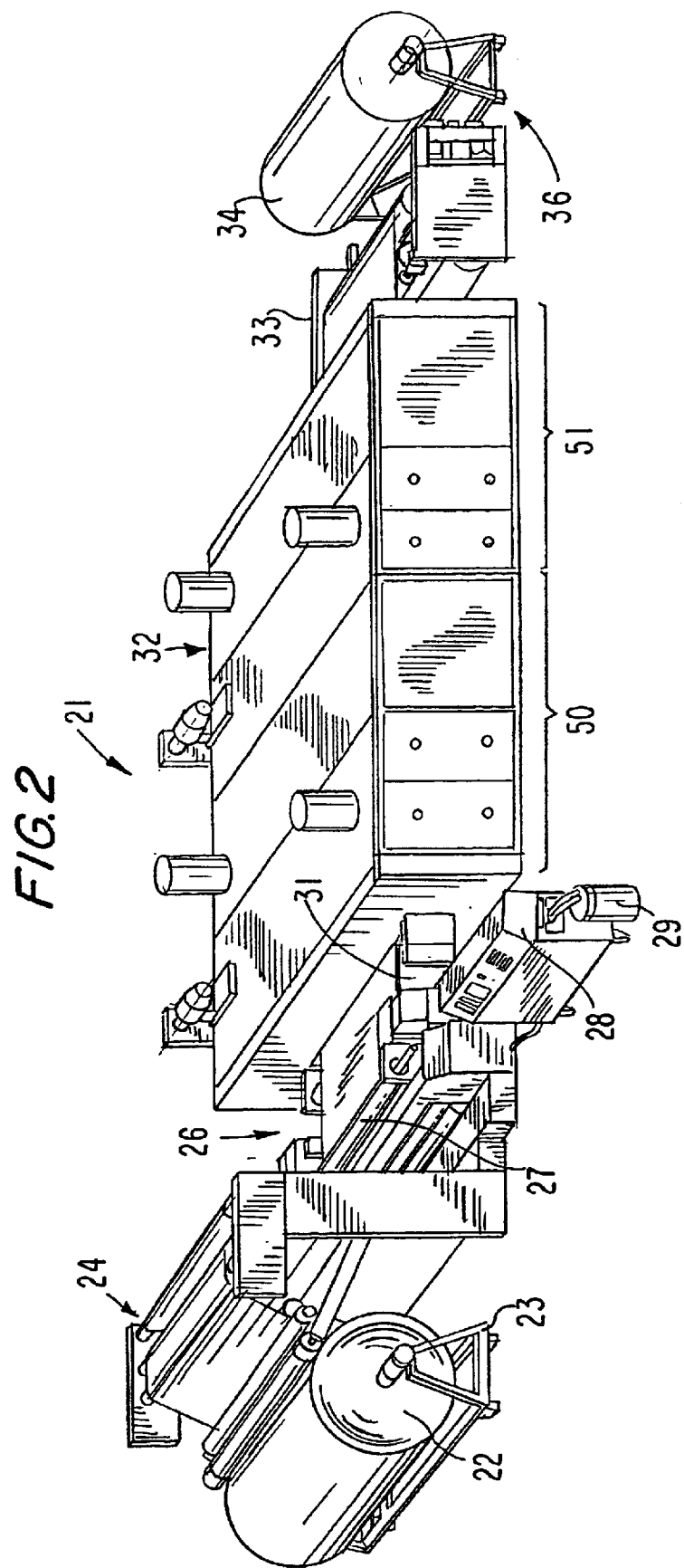
FIG. 2 is a schematic view illustrating the process steps and equipment utilized in accordance with the invention to fabricate the flame retardant adhesive tissue of FIG. 1.

Once tissue paper 12 is ready for treatment, it is treated using a screen printing apparatus 21 as illustrated in schematic FIG. 2. Here paper 11 is coated with a paste using a 17 R-screen. This supplies approximately 52 dots/cm$^2$. in a geometric or random arrangement, hence the "R" screen name designation refers to a screen applying a random pattern. Such a screen is also referred to as a random 17-mesh screen.

When coating tissue paper 17, the amount of material added during the coating operation is dependent upon the speed of transport of tissue paper 12 and the pumping speed of the paste dispersion. It has been found that it is desirable to apply between about 150% to 250% by weight wet paste pick up or about 8.5 to 59.3 g/m$^2$ (0.25 to 1.75 oz/yd$^2$) wet paste when leaving the paste-coating head region of the line. This amount of coating leaves between about 0.15 to 0.75 oz/yd$^2$ of dry solids on the paper. Depending upon the concentration of solids in the dispersion, the flame retardants added to the paper will be between about 5.1 to 8.5 g/m$^2$ (0.05 to 0.25 oz/yd$^2$). This amounts to about 15 to 25% flame retardant solids on finished paper 12. The remaining solids of between about 1.7 and 8.5 g/m$^2$ (0.15 and 0.25 oz/yd$^2$) are the polymer adhesives dots on the surface.

As noted above the amount of paste coating applied to tissue paper 11 is controlled by the speed of the pump that pumps the paste dispersion to the screen printing head. The speed of the pump is subjectively controlled by measuring the total weight of the coated paper level which allows adjustment of the level paste to the screen printing head.

When a paste dispersion is applied to the surface of tissue paper 11, flame retardant solids 16 in the paste dispersion wet out the paper leaving adhesive dots 14 on the surface of tissue paper 11. Because flame retardant solids 16 are soaked into tissue paper 11 between cellulose fibers 14, flame retardant solids 16 impart flame retardant properties to finished adhesive coated paper 11.

After application of the paste dispersion, tissue paper 12 passes through ovens at a controlled rate of speed. The speed of tissue paper 12 is controlled to be between about 16 to 42 m/min (18 to 45 yds/min). Here, water in the paste dispersion is driven off by blowing forced hot air through the oven. Flame retardant solids 16 and adhesive dots 13 stay behind on the paper substrate. Flame retardant solids 16 get trapped within cellulose fibers 14 forming the structure of tissue paper 12, while adhesive power dots 13 remain on top of the surface of tissue paper 12. After all the water has dried, the temperature of the oven is increased to at least a temperature that activates the polymer adhesive powder. In the case of a polyester powder adhesive, this temperature is between about 135° to 177° C. (275° to 350° F.). The polymer then flows and adheres to surface of tissue paper 12. If water was only dried and the adhesive dots not activated, the adhesive powder would not stick to tissue paper 12 and would be easily removed.

After coating and drying, coated tissue paper 11 leaves the oven station and is packaged accordingly to customer specifications, such as rolls ready for shipment.

Referring specifically to FIG. 2 screen paste rotating apparatus 21 utilized to fabricate coated tissue paper 11 is shown in schematic. Here, a roll of uncoated tissue paper 22 mounted on an uncoated tissue dolly 23 is positioned at the input side of screen paste coating unit 21. Tissue paper 22 is fed through a series of handling rollers 24 and directed past a paste print head assembly 26. Paste print head assembly 26 includes a print head 27 shown in more detail in FIG. 3. Paste print head assembly 26 also includes a control panel 28 for regulating the amount of paste dispersion stored in a reservoir 29 to be pumped to paste print head assembly 27.

After passing through paste print head 26, tissue paper 22 is fed over an oven feed roller 31 and enters an oven 32 in which hot air is circulated therethrough. Water in the fire retardant paste dispersion is driven off in oven 32. After the water has been removed from tissue paper 22 in oven 32, the temperature in oven 32 is increased to between about 135° to 177° C. (275° to 350° F.) to activate the polyester thermoplastic adhesive. The specific temperature selected is dependent on line speed. This causes the resin to flow and adhere to the surface of tissue paper 22. Tissue paper 22 is then passed over a series of cooling rollers 33 after which it is fed onto a pickup roll 34 also mounted on a dolly 36.

In FIG. 3, the details of the screen print head 27 in paste dot head assembly 26 are shown in more detail. Tissue paper 22 is shown being fed between a pair of print feed rollers 37 and 38. At this time, tissue paper 22 passes below a print screen 39 having a plurality of screen printing holes 41. The quantity of flame retardant paste dispersion is fed by a doctor 43 and forced through holes 41 by a rotating doctor blade 44 mounted in doctor 43 as tissue paper 22 is transported beyond screen 39. A plurality of fire retardant paste dispersion dots 46 remain on the upper surface of tissue paper 22.

After exiting paste print head assembly 26, tissue paper 22 passes over an oven feed roller 31 and is fed into a forced air oven 32. Here, the temperature of oven 32 is controlled to dry tissue paper 22 with fire retardant paste dispersion dots 46 on the surface. After drying, tissue paper 22 is heated to activate the polyester adhesive and tissue paper 22 then exists oven 32 and passes over a series of cooling rollers 33 where tissue paper 22 is cooled. At this point, the coating process is complete and coated tissue 22 is then wound on the take-up rolls 34 mounted on dolly 36 on the exit of screen paste coating unit 21.

As tissue paper 22 passes through oven 22 the speed is controlled at between about 16 to 42 m/min (18 to 45 yds/min). After all the water is removed, the temperature of oven 32 is increased to about 135° to 154° C. (275° to 310° F.). This activates the polymer adhesives which then flows and adheres to the surface of tissue paper 11. It has been found that if water is merely removed from tissue paper 22 and adhesive dots 46 are not activated, the polymer would not stick to the surface of tissue paper 22 and would be easily removed.

The flame retardant utilized in accordance with the invention is an inorganic water soluble material. It is generally supplied in concentrations of about 50% solids. This means that when 100 parts by weight is added to a mix, actually 50 parts of flame retardant solids are added. A preferred flame retardant material is supplied by Spartan Flame Retardant, Inc. of Crystal Lake, Ill. Spartan X-12 ammonium salt flame retardant would also be suitable. Additionally, flame retardants are also available from Albright & Wilson, Richmond, Va. known as Amgard® FSD. or Amgard® CL. These are water-based ammonium phosphate flame retardants made for cellulosic material.

The thermoplastic adhesive is a fine powder having a particle size of up to about 80 microns. The thermoplastic material may be a polyamide, a low or high-density polyethylene, or a polyvinyl acetate. What is important here is the fine particle size of up to about 80 microns. One suitable thermoplastic polyester adhesive that can be used in the paste dispersion, is supplied by EMS-Chemie (North America), Inc. of Sumter, S.C. This material transfers well to the tissue paper in the paste and stays in a dot form. The melting range is between about 99° to 105° C. (210° to 221° F.) and has a melt volume rate (MVR) of 450Pa.s. EMF Griltex 1P1, a polyamide tends to function as a pressure sensitive adhesives and sticks to the paper which may be too fragile for suitable use. As noted, any thermoplastic adhesive can be utilized in the formulation so long as the particle size is less than 80 microns. This permits the adhesive to remain on the surface of the tissue paper.

A synthetic thickener used in heat sealable paste formulations may be added. It is preferable to add an anionic polyacralate emulsion. These are liquid thickening agents with a very high yield producing printing paste with high consistency and viscosity and good flow characteristics. These provide printing paste with good lubrication effect and keeps the printing screen open. It has distinct thixotropic properties and prevents smearing of the paste during screen printing stand still periods. Such materials include Mirox HP, Miraplast MS 6 and Miraplast 5147 available from Boehme Filatex, Inc. of Reidsville, N.C. Between about 3 to 8 weight percent of thickener is added to the flame retardant paste dispersion for viscosity control.

Finally, one may add a printing agent used in paste formulations, such as a non-ionic solution of ethyleneoxide adduct. Such printing agents include Mirox OX Atesynth D 1290 which stabilizes aqueous paste of heat sealed resins. The Theological behavior assures the printing paste would not lead to deposits on the outside of the print screen. It prevents penetration of the printed dot into the coated fabric. Other printing agents are available from EMS Griltex. All the desired ingredients are mixed with water prior to pumping to the print head assembly.

A typical formulation would include the following ingredients:

| Ingredient | Weight % |
| --- | --- |
| Water | 35–95 |
| Flame Retardant Solution | 20–30 |
| Thickener | 4–7 |
| Thermoplastic Adhesive | 18–26 |
| Printing Agent | 5–11 |

The percent solids in the final mix is between about 20 to 40 weight percent. The viscosity of the formulation, depending upon the particular adhesive and thickening agent selected should be between 2,500–3,500 cps when tested on an Brookfield RVT using a #4 spindel at 20 RPM. The viscosity is an important component of the process, because at this viscosity, the solids and the flame retardant will move and soak in between the cellulose fibers of the tissue papers. When this happens, the flame retardant solids impart flame resistant to the adhesive coated paper.

The paper is fed from supply roll 22 through apparatus 21 at between 16 to 27 m/min (18 to 30 yds/min). The paper is coated utilizing a flame retardant paste dispersion using a 17 R-4 screen. This supplies approximately 52 dots/cm$^2$ in a random arrangement. It has been found that due to the fragile nature of the paper, during start up, if adhesive paste dispersion is added to the paper, it tends to weaken the resulting coated tissue paper product. Accordingly, the paste print head is not activated until the base tissue paper is supplied at the speed of about 18 to 27 m/min (20 to 30 yds/min).

A 17 R-4 printing screen has 11% open surface. This is the open surface area of the dots providing an open surface and a 525 opening micron size. A wide variety of other type screens could be used, such as screens with mesh numbers 11.2, 14 and 25. Screen selection will be dependent upon viscosity of the dispersion as well as the pumping speed and tissue paper speed in the apparatus.

The following example is set forth for purposes of illustration only, and not intended to be presented in a limiting sense.

EXAMPLE 1

A flame retardant paste dispersion formulation as follows is prepared by adding ingredients under constant mixing:

| Ingredient | Amount (weight %) |
| --- | --- |
| Water | 41 |
| Spartan FR48 | 22 |
| Mirox HP (thickener) | 6 |
| EMS Griltex L365E P1 (adhesive) | 22.5 |
| Mirox OX (printing agent) | 8.5 |

The percent solids for the final paste mix is between about 28 to 32%. The viscosity is between about 1,800 and 3,500 cps when tested on the Brookfield RVT using a #4 spindel at 20 RPM. It is anticipated that this composition will impart flame resistance to adhesive coated paper and provide flamer retardant solids of approximately 10 weight percent.

EXAMPLE 2

An uncoated tissue paper having a weight specification between 17.0 and 21.0 g/m$^2$ (0.50 and 0.62 oz/yd$^2$) from Cellu Tissue Corp. of Grouverneur, N.Y., and is their product Grade 3284. It is also known as 11 pound paper and is coated utilizing dispersion prepared in Example 1 in a screen paste coating apparatus illustrated in FIG. 2. The line speed is maintained between about 18 to 23 m/min (20 to 25 yds/min) The coated dry paper after leaving the oven is batched up at the lines batcher end 2,000 yard rolls ready for shipment Flame testing is done in a composite by laminating the resulting coated tissue paper to a high loft polyester felt. It is then tested using the Federal Motorvehical Safety Standard #302 (MVSS #302) test procedure.

A flame retardant adhesive tissue in accordance with the invention provides a coated with dots of a thermoplastic adhesive and an inorganic flame retardant dispersed throughout the tissue fibers. The coated paper is particularly well suited for use in automotive doors to dampen sound.

It will thus be seen that the objects set forth above, among those made apparent from the preceding description, are efficiently attained and, since certain changes may be made in carying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients and compounds recited in the singular are intended to include compatible mixtures of such ingredients whatever the sense permits.

What is claimed is:

1. A method for preparing a flame retardant adhesive tissue paper, comprising:

providing a length of tissue paper;

providing an aqueous dispersion of an inorganic flame retardant and powder thermoplastic adhesive resin;

depositing the aqueous dispersion of flame retardant and thermoplastic resin on one surface of the tissue paper;

drying the coated tissue paper to remove the water from the aqueous dispersion;

increasing the temperature of the coated tissue to activate the thermoplastic resin to adhere to the surface of the tissue paper; and cooling the coated tissue paper.

2. The method of claim 1, including by transporting the tissue paper over rollers and continuously applying the aqueous dispersion to the surface of the tissue as the tissue is transported.

3. The method of claim 2, wherein the amount of dispersion applied to the surface of the tissue is controlled by adjusting the line speed of the moving tissue.

4. The method of claim 1, wherein the tissue with aqueous dispersion is dried by passing the tissue through an oven to heat the tissue.

5. The method of claim 1, wherein the step of depositing the aqueous dispersion includes applying the dispersion by a doctor blade.

6. The method of claim 1, wherein the step of depositing the aqueous dispersion includes depositing the dispersion in spots.

7. The method of claim 6, including depositing the spots in a pattern.

* * * * *